L. R. BLACKMORE.
APPARATUS FOR MAKING GLASS TILING.
APPLICATION FILED OCT. 17, 1907.
972,433.
Patented Oct. 11, 1910.
3 SHEETS—SHEET 2.
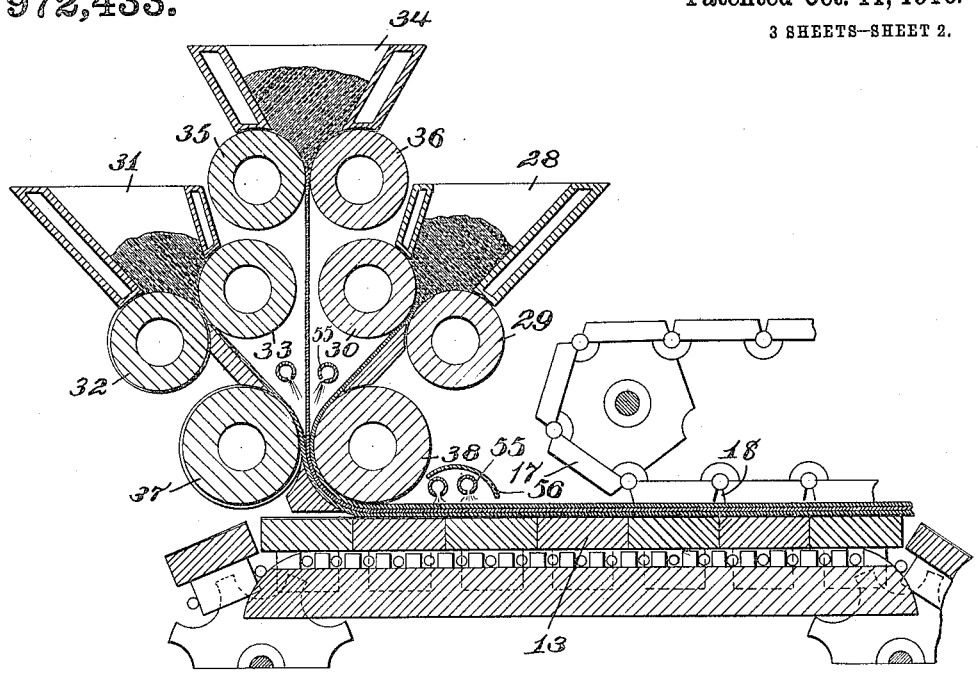
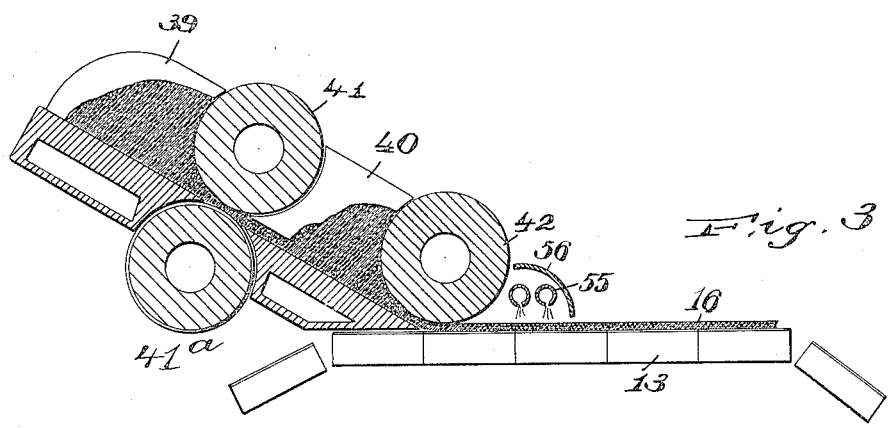
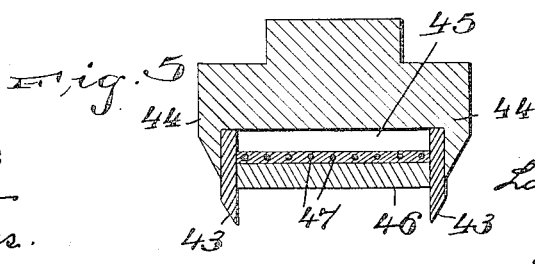
WITNESSES:
E. A. Pell
S. A. Rogers
INVENTOR
Lawrence R. Blackmore
BY
Wm H. Camfield
ATTORNEY

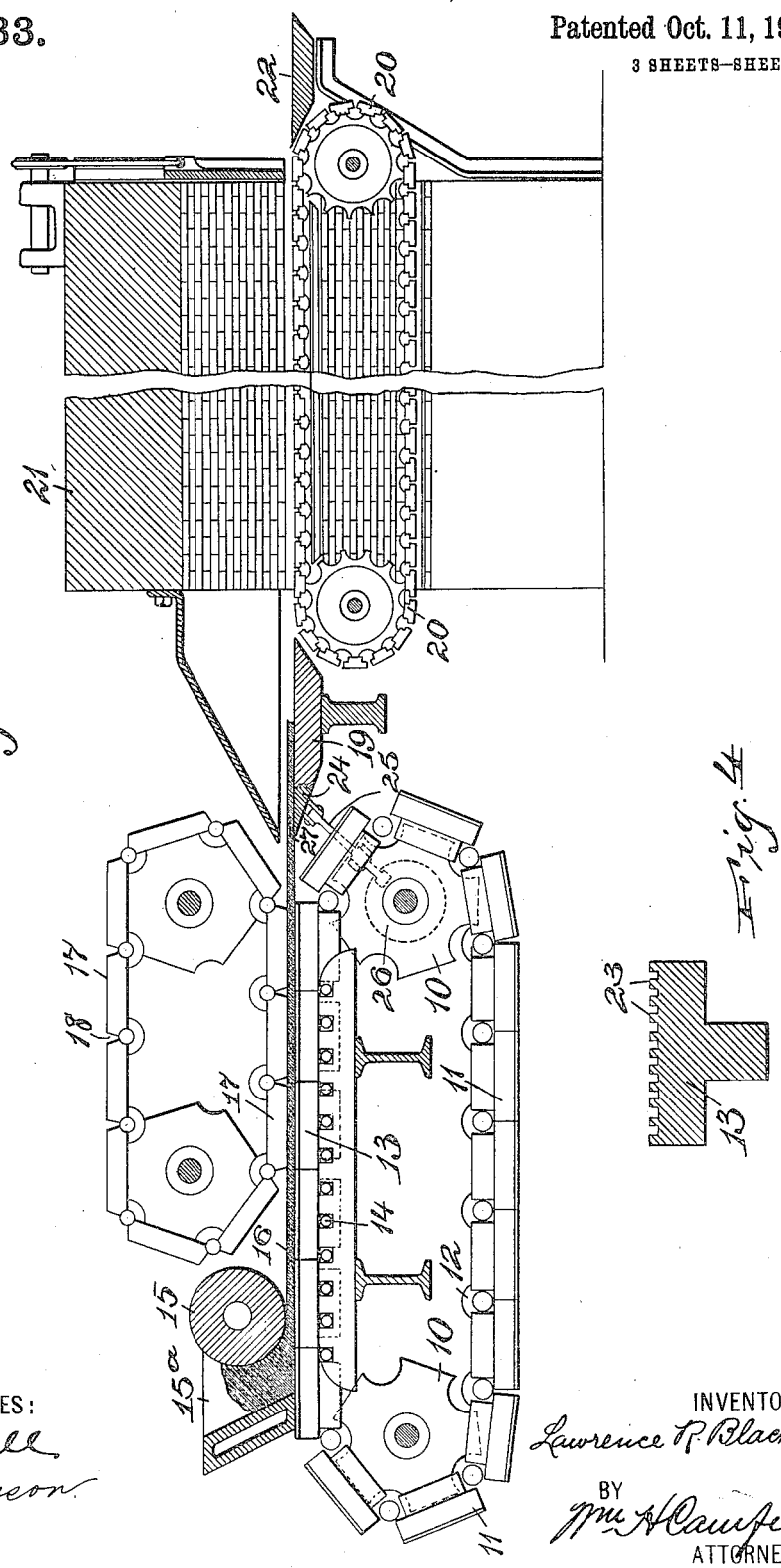

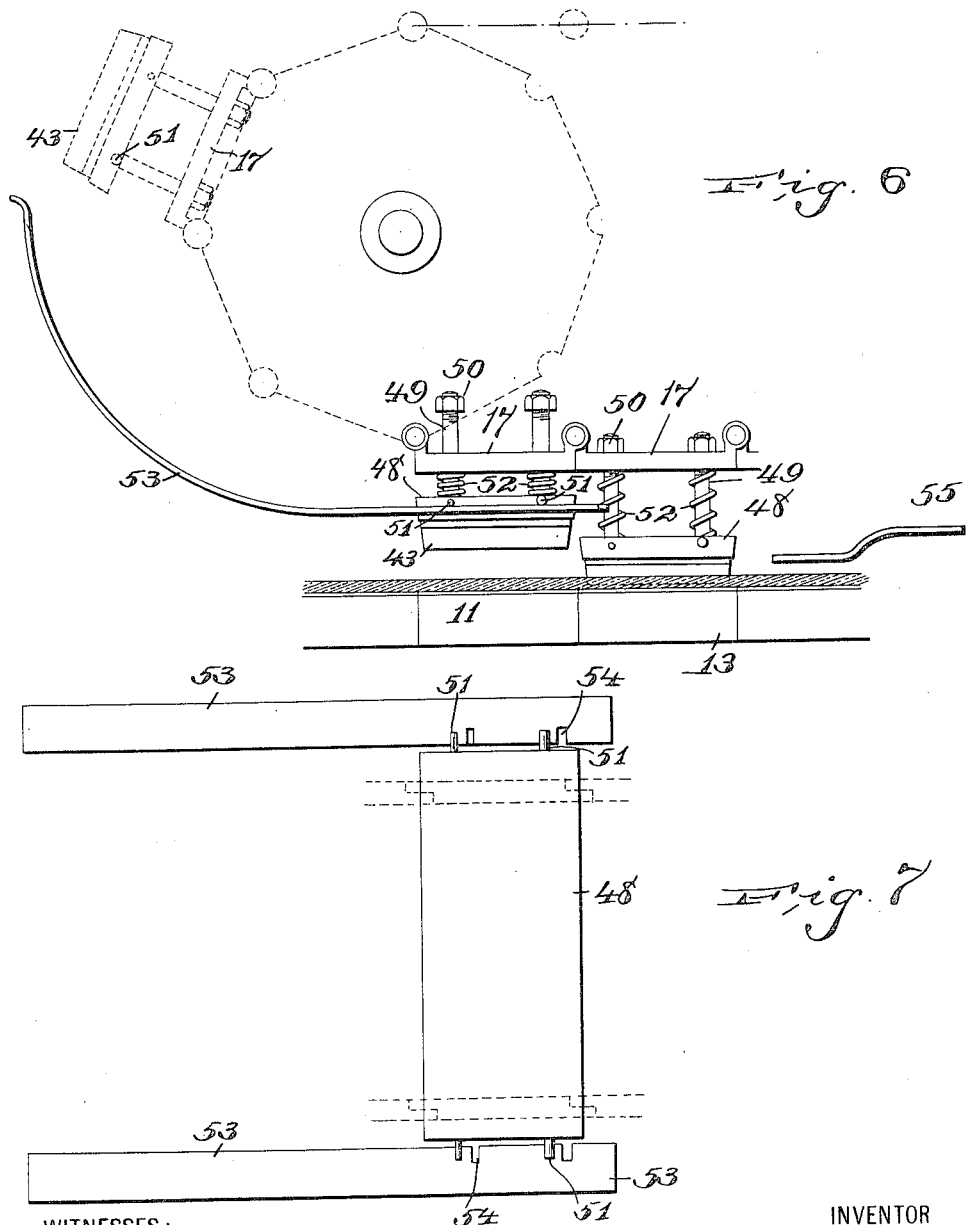

UNITED STATES PATENT OFFICE.

LAWRENCE R. BLACKMORE, OF ARLINGTON, NEW JERSEY.

APPARATUS FOR MAKING GLASS TILING.

972,433.

Specification of Letters Patent. Patented Oct. 11, 1910.

Application filed October 17, 1907. Serial No. 397,793.

*To all whom it may concern:*

Be it known that I, LAWRENCE R. BLACKMORE, a citizen of the United States, residing at Arlington, in the county of Hudson and State of New Jersey, have invented certain new and useful Improvements in Apparatus for Making Glass Tiling; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to the manufacture of glass tiling, and is designed to provide a method for making glass tiling, with a smoothed unwrinkled face, in a quick and continuous manner, first rolling a sheet of glass on a movable endless table, and cutting the moving sheet into tiles while it is still plastic.

The invention is also designed to provide an apparatus by means of which a sheet may be formed with the rolling action, and then cut into tiling, both the method and the apparatus also being adapted to form a tile with undercut portions on the back to form clenching ribs or projections so that the tile can be securely held in place.

In carrying out my improved method, I roll a sheet of glass on an endless table made up of a series of plates, the roll being stationary, and then, by means of a series of suitable dies, cut out the sheet of glass to the required size of tiling. The movable sheet is then passed into the usual form of firing kiln, and when it emerges therefrom the plate can be broken off into tiles, the cutting operation not quite penetrating the sheet of glass, so that in the passage through the kiln, on an endless platform, the tiles are held together. A further improvement in this method is that the plates making up the endless table can be formed, on their upper surfaces, with a series of ribs arranged in line or otherwise, thus forming a series of parallel ribs on the back of the plate, and an upsetting mechanism can be installed underneath the moving sheet of glass tiles to give a side pressure to these ribs so as to partly upset them and form inclined projections, with the corresponding recesses, to hold the tile in place, when it is placed in a setting material.

The invention further consists in providing a method whereby the movable table can be passed underneath a series of rolls, feeding glass from a multiple series of hoppers, so that an opaque or expensive glass can be used on the face of the plate, and a cheaper grade of glass or a flint glass can be used on the back of the plate. In another instance, transparent glass can be rolled on the face of the plate, and a colored glass, such as ruby glass or an emerald glass can be rolled inside the plate, thus making a handsome and at the same time an economical species of glass tile.

Another improved feature of this machine, carrying out the method hereinabove described, is a construction that allows the die, while in motion, to be forced down or dropped down upon the glass plate with an impact, while the plate is in motion, whereby the whole die settles on the plate at the same time so that there is no distortion of the plate by an angular pressure. The dies are raised from the plate in the same manner while in motion, having the tile perfectly level.

The invention is illustrated in the accompanying drawings, in which—

Figure 1 is a section of the apparatus employed in carrying out my method. Fig. 2 is a section of a modified form of a series of hoppers and rollers, and Fig. 3 is a similar view showing a pair of rollers with their hoppers. Fig. 4 is a cross-section of one of the plates making up the moving table, and Fig. 5 is a section of one of the dies showing a modified form of construction. Fig. 6 is a diagrammatic side view showing the construction where the dies are forced down flat against the glass plate, while the plate and the dies are in motion. Fig. 7 is a plan view of the construction shown in Fig. 6, with the chain shown in dotted outline.

In the drawings, the rollers 10 are driven by any suitable mechanism and cause the rotation of a series of links 11 which are joined together by means of the pivots 12. When the links are uppermost and closely joined together to form a table 13, they are preferably passed over the rollers 14 to take up the undue friction and make the operation of the machine easier. Suitably disposed above the table 13, which constantly moves, is a roller 15 adjacent to the usual style of hopper 15ª, into which the glass is deposited in its molten state. The moving table carries the glass underneath the roller 15 and forms it into a sheet 16 which is passed slowly along. As the sheet 16 emerges from underneath the roll, it is engaged by suitable dies 17 which have cutting edges to nearly penetrate the plate and cut out the tile. At the same time, the pressure on the tile gives it an even face, and the excess material, squeezed up by this pressure, is forced up into the spaces 18 between the dies 17, and thus a clean edged tile is the result. Any slight space between the links 13, into which some of the glass might run, is in line with the openings or spaces between the dies 17, and thus this unevenness, both on the face and on the back of the plate, is in the waste material and is tossed aside, when the tiles are broken apart, to be melted over. The plate 16 is then passed over a table 19 and onto a moving platform 20, by means of which it is carried through the kiln 21, and beyond it onto a table 22, on the end of which the tiles can be broken off as they emerge.

I prefer to make the face or outer surface of the links 13 with ribs 23 which form longitudinal spaces between them, and thus form a series of ribs and recesses in parallel relation on the back of the glass plate, and thus on the back of the tiles. When the glass plate passes onto the platform 19, it slides over a bar 24 which reciprocates transversely, being moved by means of a suitable mechanism, such as a lever 25 operating on the cam 26. This slight reciprocation of the bar 24 gives an alternate side pressure on the ribs on the back of the plate, by means of the projecting pins or fingers 27, the transverse motion of the bar and also of the pins being very slight and just enough to bend over the end of the plastic rib on the back of the tile, sufficient to throw it out of the vertical or perpendicular, so that a clencher or anchoring rib is the result.

In Fig. 2 is illustrated a modification whereby a hopper 28 can be used to contain glass, such as a transparent or a flint glass, passing out through the rollers 29 and 30, and on the opposite side can be employed a hopper 31 with similar glass passing out through the rollers 32 and 33. The hopper 34 at the top, or suitably disposed between the other hoppers, can contain colored glass, such as ruby glass, and this, passing out through the rollers 35 and 36, forms a plate running down, the glass from all three of the hoppers then being passed between the rollers 37 and 38 and then onto the table 13, after which it is treated in the manner above described, for a sheet made of one kind of glass only. In the construction shown in Fig. 3, I can employ a hopper 39, and a hopper 40 below it, with the rollers 41 and 42 respectively, whereby a sheet of glass of two different kinds is rolled on the table 13, and in this form a cheaper grade of glass can be used to come in contact with the table to form the ribs, and a better quality of glass or an opaque glass can be used for the face of the glass plate and the consequent tiles. In this structure the glass is handled the same as previously described, and as illustrated in Fig. 1. The dies 17 have the cutting edges 43, and the dies are cut away as at 44, so as to give room for the excess material to pass up between the dies.

In constructions where I employ a multiplicity of hoppers to roll different kinds of glass into the same plate, I install, at suitable points, the burners 55 which can be provided with the shields 56, and are adapted to throw the heat upon the glass to keep it plastic enough so as to make the action of the dies easy.

In the construction shown in Figs. 2 and 3, say for instance in Fig. 2, the roll 32 and the roll 37 are ribbed, and also the platform on which the glass passes between these two rolls, and likewise the platform on which the roll 38 presses the three united sheets of glass. It will be understood that the glass finds the grooves slightly larger as it proceeds, that is there is a gradual widening of the grooves taken from the roll 32 down to the table 13 which must be done to accommodate the ribs on the glass sheet which are plastic, and have a tendency to gradually widen out in passing from one to the other of the grooved elements, and thus the grooves must be made slightly larger. This is also true, in Fig. 3, of the grooves in the roller 41$^a$ and the oblique platform of the hopper below it, and of the table 13, these also getting gradually larger as the glass proceeds.

I may form, if I desire, a space 45 behind the plate 46 of the die, and in the space 45 I can install wires 47 adapted to heat the die to an even temperature at all times, so that it will not become chilled when passing around out of contact with the glass, and no wrinkling will occur on the face of the tile with which the die comes in contact. This heated die is particularly advantageous when making opaque tiling, because the material that is mixed into the glass, to form the white tile, is a chemical so that if the glass is heated too long, or if it is suddenly chilled, this material is driven out and the glass becomes flint glass, without any color. This is particularly true where a glass tile or a plate is subjected to a die, either while it is in the mold or on the table, and the coloring or white material is driven back from the edges of the tile, giving it a bluish tinge, and the tiles, when set up in groups, have a mottled effect or appearance. With my heated die, with its surface the same temperature all over, this will not occur, and a tile stamped out with this heated die will be of the same shade on the entire surface of its face.

In Fig. 6 is illustrated a modified form of die and mechanism for operating it, that does not have the die contact with the plate at an angle to it, but causes it to come down squarely on the top. In this construction the die plates 17 are linked together to form the conventional chain, and secured to each die plate 17, is a die 48 that may have bolts 49 with nuts 50 thereon to limit the movement of the die, when it is out of engagement with the plate and passing around the machine. Each of the dies has, on its two ends, pins 51, the leading one of which is much larger than the second one, so that the pins engage a pair of shields or guides 53 which pull or force in the dies 48, against the action of the springs 52, so that the dies pass along, held out of engagement with the glass sheet by the pins resting on the guides 53. The guides 53 are provided with a pair of perforations 54, one being adapted to receive the large pin 51, and the other one being of a size to allow the passage through it of the smaller pin 51. The large pin will thus pass over the first or small perforation or recess 54, and when the large pin 51 comes in register with the large recess 54, the small pin does the same with its respective recess, and they simultaneously pass through and allow the springs 52 to snap the die down on the glass plate, and at the same time the glass plate is in motion at the same speed as the die, so that there is no possibility of distorting the tile. A suitable device 55 is a curved plate that can be installed to cause a direct lifting of the die plates 48 so that they can leave the glass sheet vertically, and not cause any distortion of the glass tile.

Having thus described my invention, what I claim is:—

1. An improved apparatus for making glass tiling, comprising an endless table and a fixed roll, a hopper adjacent to the roll, and a series of dies to be brought in engagement with the sheet to cut it into tiling while it is on the moving table and in motion.

2. An improved apparatus for making glass tiling, consisting of an endless moving table, the moving table comprising links, a roll, a hopper adjacent to the roll, a set of dies to engage a glass sheet on the table, the juncture of the dies coming in register with the juncture of the links.

3. In an improved apparatus for making glass tiling, an endless table consisting of links having parallel ribs and recesses on their faces, a fixed roller, a hopper adjacent to the roller, and a transversely moving bar with projections to enter the spaces on a sheet of glass rolled on the plate, the transverse movements of the bar and its projections causing the ribs on the back of the sheet of glass to be bent out of the perpendicular.

4. In an improved apparatus for making glass tiles, an endless table consisting of links having projections on their faces, a roller and a hopper acting to roll a sheet of glass on the table, a series of dies to cut the sheet into tiling while it is in motion on the endless table, and a transverse movable bar having projections to enter the recesses on the back of the sheet of glass, and means for reciprocating the bar.

5. In an apparatus for manufacturing glass tiles, an endless table consisting of links having projections on their faces, a roll and a hopper to roll a sheet of glass on a moving table, a series of dies to engage the glass sheet, the dies having spaces between them for the reception of the excess material, and means for upsetting the ribs on the back of the tiles while they are in motion.

6. In an apparatus for manufacturing glass tiles, a moving table, a roller acting to roll a sheet of glass on the moving table, dies moving in the same direction as the glass and suspended above the same, and means for successively forcing the dies in contact with the glass sheet.

7. In an apparatus for manufacturing glass tiles, an endless table, a roll and a hopper to roll a sheet of glass on the moving table, an endless series of dies suspended above the table, and means for successively forcing each die squarely on the sheet on the moving table.

8. The improved method for making glass tiles which consists in rolling a sheet of glass, and rolling on either side of said sheet an additional sheet while the first sheet is still plastic, one of the outside sheets of glass having ribs on its outer face, and the other outside sheet being rolled to form the face of the assembled sheets.

9. The improved method of making glass tiling which consists in rolling a sheet of glass and rolling a second sheet of glass with ribs on one side, then rolling these sheets together while still plastic, one side being rolled to maintain the ribs thereon to form a back, and the other side of the assembled sheets being rolled to form the face, the sheet being fed onto a table and resting on the ribs on the back of the sheet, whereby the face is submitted to no contact to distort it.

10. The improved method of making glass tiling which consists in rolling a sheet of glass and rolling a second sheet of glass with ribs on one side, then rolling these sheets together while still plastic, one side being rolled to maintain the ribs thereon to form a back, and the other side of the assembled sheets being rolled to form the face, the sheet being fed onto a moving table and cut into tiles while in motion.

11. The improved method of making glass tiling which consists in rolling a sheet of glass and rolling a second sheet of glass with ribs on one side, then rolling these sheets together while still plastic, one side being rolled to maintain the ribs thereon to form a back, and the other side of the assembled sheets being rolled to form the face, the sheet being fed onto a moving table and cut into tiles while in motion, and then having the ribs on the back of the sheet subjected to a transverse pressure to upset the ribs.

In testimony, that I claim the foregoing, I have hereunto set my hand this 14th day of October 1907.

LAWRENCE R. BLACKMORE.

Witnesses:
WM. H. CAMFIELD,
E. A. PELL.